US012561927B2

(12) United States Patent
      Zhou

(10) Patent No.: US 12,561,927 B2
(45) Date of Patent: Feb. 24, 2026

(54) MEDIA RESOURCE DISPLAY METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventor: Wenjun Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 181 days.

(21) Appl. No.: 18/342,458

(22) Filed: Jun. 27, 2023

(65) Prior Publication Data

US 2023/0343056 A1 Oct. 26, 2023

Related U.S. Application Data

(63) Continuation of application No. PCT/CN2022/130971, filed on Nov. 17, 2022.

(30) Foreign Application Priority Data

Jan. 21, 2022 (CN) .......................... 202210074255.7

(51) Int. Cl.
      *G06T 19/20* (2011.01)
      *G06F 3/04815* (2022.01)
      (Continued)

(52) U.S. Cl.
      CPC .......... *G06T 19/20* (2013.01); *G06F 3/04815* (2013.01); *G06F 3/0488* (2013.01);
      (Continued)

(58) Field of Classification Search
      CPC ...... G06F 3/04842; G06F 16/44; G06F 16/70; G06F 3/04847
      See application file for complete search history.

(56) References Cited

U.S. PATENT DOCUMENTS

2009/0282335 A1* 11/2009 Alexandersson ....... G06F 3/167
                                                                  715/716
2010/0162171 A1* 6/2010 Felt ................... H04M 1/27475
                                                                  715/835

(Continued)

FOREIGN PATENT DOCUMENTS

CN        110102053 A      8/2019
CN        111589128 A      8/2020

(Continued)

OTHER PUBLICATIONS

Nafarrete, Jonathan, "What a Neflix Video Store Looks Like in Virtual Reality", VR Scout, May 25, 2016, published at https://vrscout.com/news/netflix-video-store-virtual-reality/ and archived as of May 26, 2016 as archive.org (Year: 2016).*

(Continued)

*Primary Examiner* — William A Beutel

(74) *Attorney, Agent, or Firm* — Sughrue Mion, PLLC

(57) ABSTRACT

The disclosure discloses a media resource display method including: displaying a virtual scene; displaying a resource screen of at least one first media resource in the virtual scene; and displaying, in response to a move operation on a target virtual object in the virtual scene, based on a target position of the target virtual object, a resource screen of at least one second media resource corresponding to the target position in the virtual scene.

16 Claims, 9 Drawing Sheets

(51) Int. Cl.
   *G06F 3/0488*   (2022.01)
   *G06V 10/25*   (2022.01)
   *G09G 5/37*   (2006.01)

(52) U.S. Cl.
   CPC .............. *G06V 10/25* (2022.01); *G09G 5/37*
      (2013.01); *G06T 2219/2004* (2013.01); *G09G*
      *2320/0626* (2013.01); *G09G 2340/045*
      (2013.01)

(56)                  References Cited

U.S. PATENT DOCUMENTS

| 2012/0173991 | A1* | 7/2012 | Roberts | ............... | G06F 3/04815 |
| | | | | | 715/747 |
| 2014/0149427 | A1* | 5/2014 | Wilder | .................... | G06F 16/44 |
| | | | | | 707/748 |
| 2014/0229834 | A1* | 8/2014 | Jain | ................ | H04N 21/440263 |
| | | | | | 715/720 |
| 2016/0191997 | A1* | 6/2016 | Eklund | .............. | H04N 21/4314 |
| | | | | | 725/59 |

| 2020/0225822 | A1* | 7/2020 | Meng | .................... | G06F 3/0482 |
| 2022/0393995 | A1* | 12/2022 | Park | ........................ | H04L 51/10 |

FOREIGN PATENT DOCUMENTS

| CN | 111672104 A | 9/2020 |
| CN | 112717400 A | 4/2021 |
| CN | 113573089 A | 10/2021 |
| CN | 114415907 A | 4/2022 |

OTHER PUBLICATIONS

Syntoren (Syntoren, "Warcraft 3 Guide—Control Groups Part 1 (Basics)", length 13:41, published at YouTube on Jun. 18, 2016, at https://www.youtube.com/watch?v=3vSV-sMX4f8) (Year: 2016).*
Gamify, "How To Put a Game On Your Website", YouTube video published Nov. 8, 2020 at https://www.youtube.com/watch?v=fPzsWFJ2JG8 (Year: 2020).*
International Search Report for PCT/CN2022/130971 dated Jan. 28, 2023 [PCT/ISA/210].
Chinese Office Action for 202210074255.7 dated May 26, 2023.

* cited by examiner

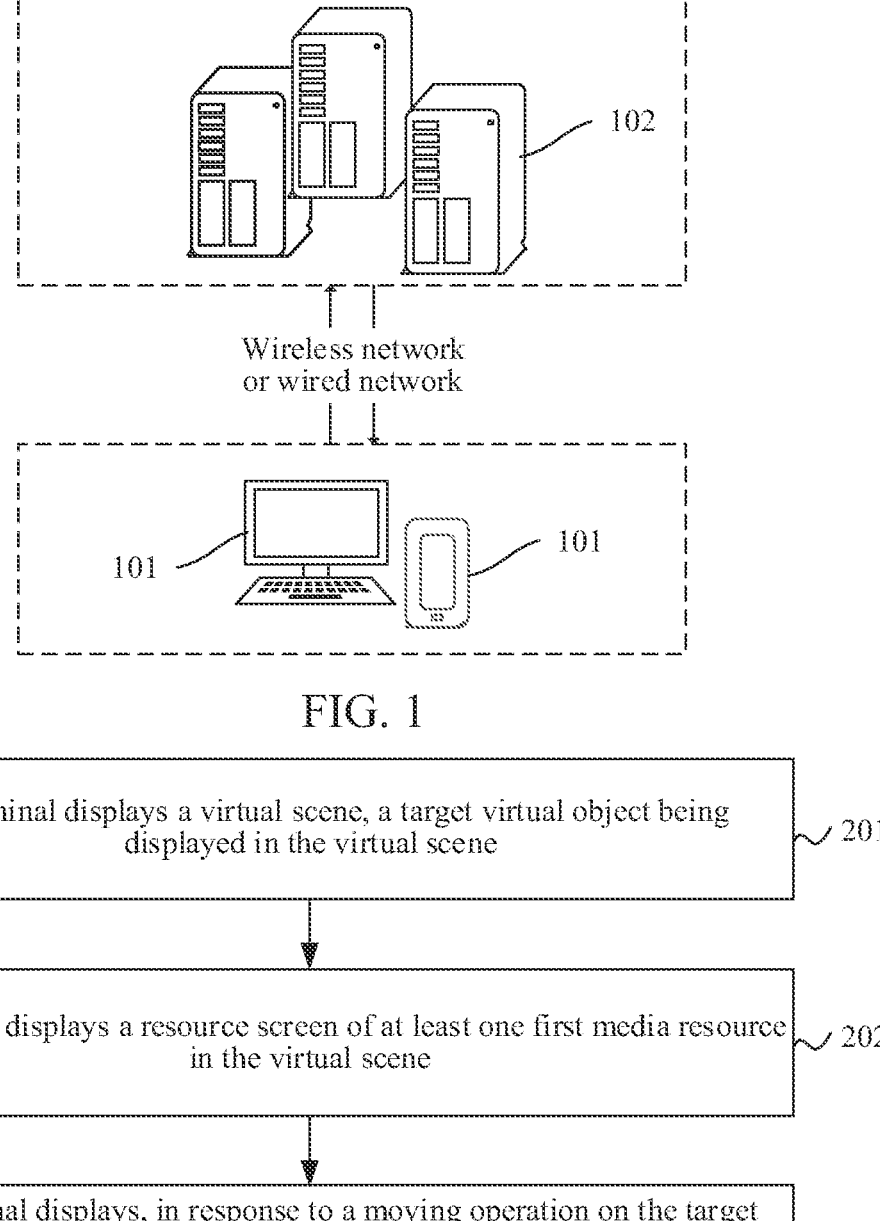

The terminal displays a virtual scene, a target virtual object being displayed in the virtual scene     201

The terminal displays a resource screen of at least one first media resource in the virtual scene     202

The terminal displays, in response to a moving operation on the target virtual object in the virtual scene, based on a target position of the target virtual object, a resource screen of at least one second media resource corresponding to the target position in the virtual scene     203

FIG. 2

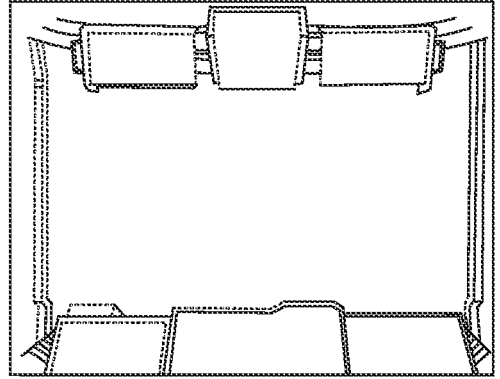
Resource picture of
picture gallery
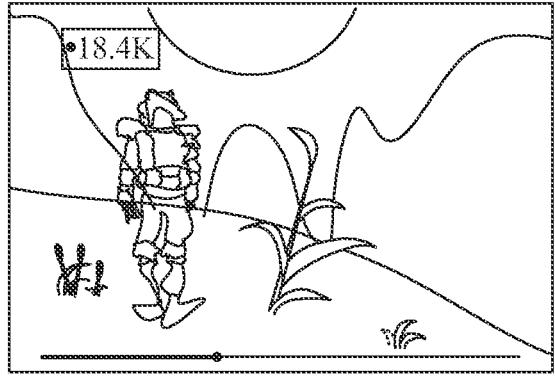
Resource picture of
video
Resource picture of
interaction information
FIG. 3

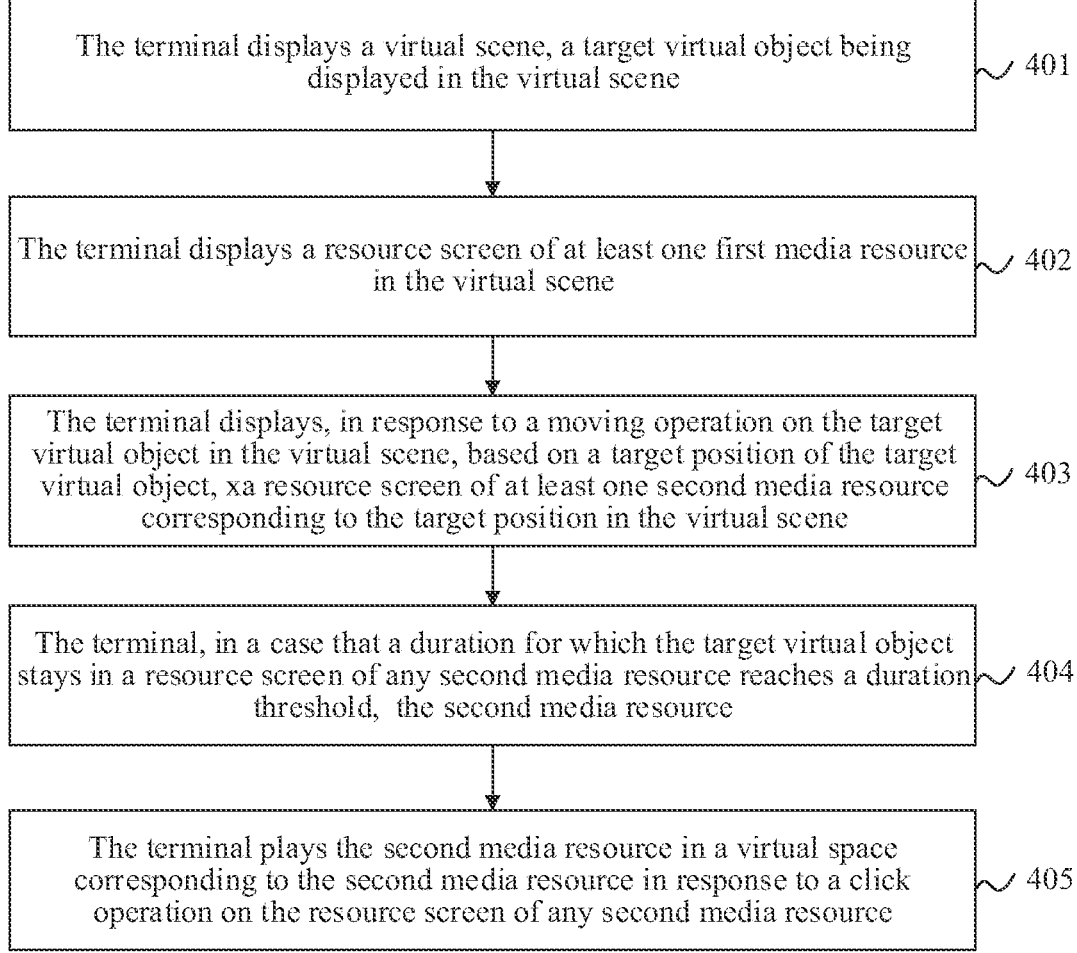

The terminal displays a virtual scene, a target virtual object being displayed in the virtual scene ~ 401

The terminal displays a resource screen of at least one first media resource in the virtual scene ~ 402

The terminal displays, in response to a moving operation on the target virtual object in the virtual scene, based on a target position of the target virtual object, xa resource screen of at least one second media resource corresponding to the target position in the virtual scene ~ 403

The terminal, in a case that a duration for which the target virtual object stays in a resource screen of any second media resource reaches a duration threshold, the second media resource ~ 404

The terminal plays the second media resource in a virtual space corresponding to the second media resource in response to a click operation on the resource screen of any second media resource ~ 405

FIG. 4

MEDIA RESOURCE DISPLAY METHOD AND APPARATUS, DEVICE, AND STORAGE MEDIUM

CROSS REFERENCE TO RELATED APPLICATIONS

This application is a continuation of International Patent Application No. PCT/CN2022/130971 filed Nov. 9, 2022, which claims priority to Chinese Patent Application No. 202210074255.7, filed on Jan. 21, 2022 with the China National Intellectual Property Administration, the disclosures of which are incorporated herein by reference in their entireties.

FIELD

The disclosure relates to the field of computer technologies, and in particular, to a media resource display method and apparatus, a device, and a storage medium.

BACKGROUND

With the development of network technologies, the number of media resources in the network is increasing continuously, and viewing media resources has become an entertainment for an increasing number of people.

SUMMARY

Embodiments of the disclosure provide a media resource display method and apparatus, a device, and a storage medium, and the method can improve the experience of objects browsing media resources. The technical solutions are as follows:

According to some embodiments, a media resource display method is provided, and the method includes:

displaying a virtual scene, a target virtual object being displayed in the virtual scene;

displaying a resource screen of at least one first media resource in the virtual scene; and displaying, in response to a move operation on the target virtual object in the virtual scene, based on a target position of the target virtual object, a resource screen of at least one second media resource corresponding to the target position in the virtual scene.

According to some embodiments, a media resource display apparatus is provided, and the apparatus includes:

a scene display module, configured to display a virtual scene, a target virtual object being displayed in the virtual scene; and a resource display module, configured to display a resource screen of at least one first media resource in the virtual scene, the resource display module being configured to display, in response to a move operation on the target virtual object in the virtual scene, based on a target position of the target virtual object, a resource screen of at least one second media resource corresponding to the target position in the virtual scene.

According to some embodiments, a computer device is provided, and the computer device includes one or more processors and one or more memories, the one or more memories storing at least one computer program, and the at least one computer program being loaded and executed by the one or more processors to implement the media resource display method.

According to some embodiments, a computer-readable storage medium is provided, and the computer-readable storage medium stores at least one computer program, the least one computer program being loaded and executed by a processor to implement the media resource display method.

According to some embodiments, a computer program product is provided, the computer program product including at least one computer program, the at least one computer program being stored in a computer-readable storage medium. A processor of a computer device reads the at least one computer program from the computer-readable storage medium, and the processor executes the at least one computer program, so that the computer device implements the media resource display method.

BRIEF DESCRIPTION OF THE DRAWINGS

FIG. 1 is a schematic diagram of an implementation environment of a media resource display method according to some embodiments of the disclosure.

FIG. 2 is a flowchart of a media resource display method according to some embodiments of the disclosure.

FIG. 3 is a schematic diagram of a resource screen according to some embodiments of the disclosure.

FIG. 4 is a flowchart of a media resource display method according to some embodiments of the disclosure.

DETAILED DESCRIPTION

Figure 5:
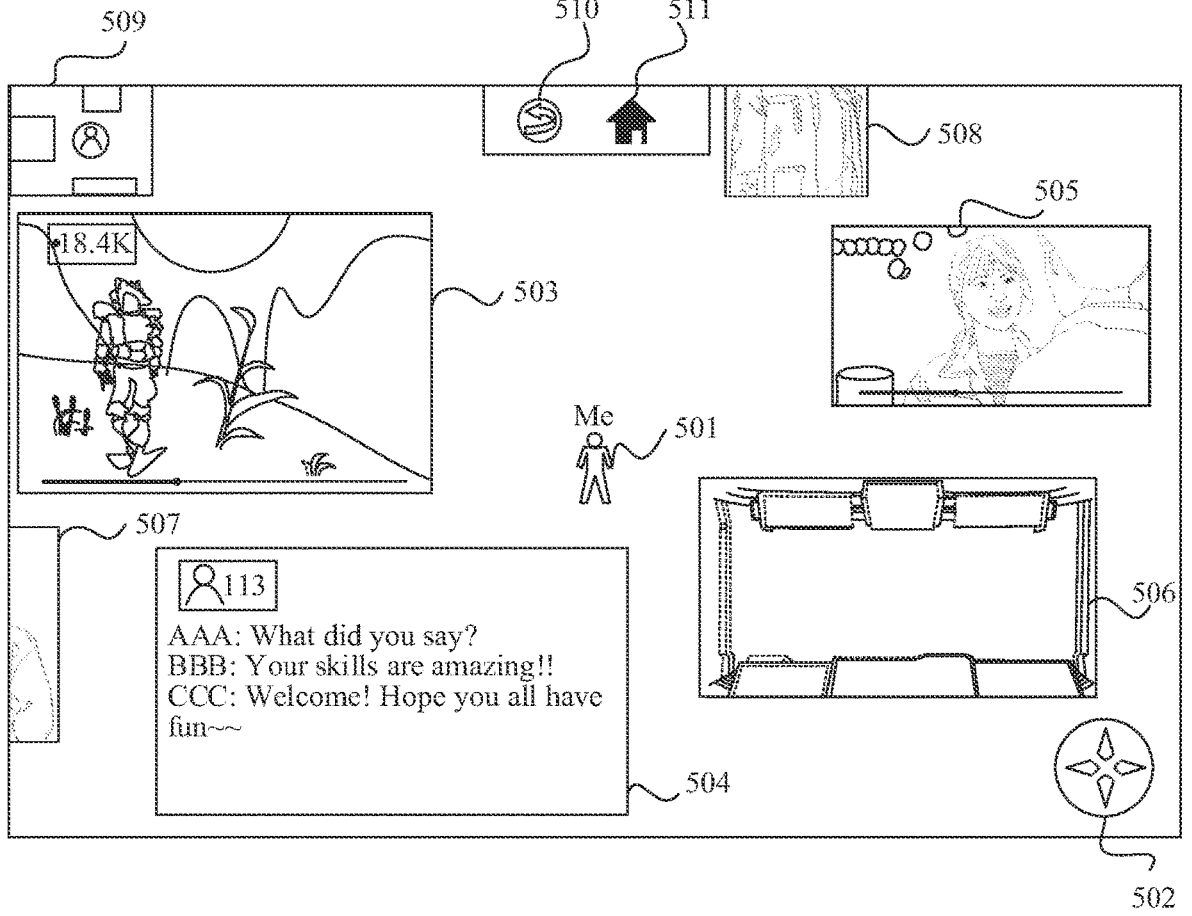
FIG. 5 is a schematic diagram of a central region of a virtual scene according to some embodiments of the disclosure.

At present, applications that support a media resource display function tend to display a plurality of media resources in a page in the form of a list for objects to browse, so that the objects can select the media resources of interest to view.

In the above technology, the objects can only browse the media resources in the page by sliding the page, and the human-computer interaction mode is single, resulting in a poor object experience.

For ease of understanding the technical solutions in the embodiments of the disclosure, some terms involved in the embodiments of the disclosure are explained below.

Virtual scene: It is a virtual scene displayed (or provided) by an application when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of the disclosure. For example, the virtual scene may include the sky, the land, the ocean, or the like. The land may include environmental elements such as the desert and a city. The user may control the virtual object to move in the virtual scene.

Virtual object: a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In some embodiments, the virtual object is a player character controlled through an operation on a client, or an artificial intelligence (AI) character set in a virtual scene battle through training, or a non-player character (NPC) set in a virtual scene. In some embodiments, the virtual object is a virtual character performing sports in a virtual scene. In some embodiments, the number of virtual objects participating in the interaction in the virtual scene is preset or dynamically determined according to the number of clients participating in the interaction.

An implementation environment of the disclosure is described below. FIG. 1 is a schematic diagram of an implementation environment of a media resource display method according to some embodiments of the disclosure. As shown in FIG. 1, the implementation environment includes a terminal 101 and a server 102, and the terminal 101 and the server 102 are connected to each other through a wired network or wireless network.

The terminal 101 may be a smartphone, a tablet computer, a notebook computer, a desktop computer, a smart speaker, a smartwatch, or the like. This is not limited in the embodiments of the disclosure. An application supporting a media resource display function is installed and run in the terminal 101. In some embodiments, the application is a video application, a livestreaming application, a social application, a game application, or the like. In some embodiments, the terminal 101 is a terminal used by an object, and an object account of the object is logged in to the application run in the terminal 101.

The server 102 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. In some embodiments, the server 102 is configured to provide a backend service for the application supporting the media resource display function.

In some embodiments, there may be more or fewer terminals 101 or servers 102. This is not limited in the embodiments of the disclosure.

Based on the implementation environment shown in FIG. 1. FIG. 2 is a flowchart of a media resource display method according to some embodiments of the disclosure. The method is performed by a terminal. As shown in FIG. 2, this embodiment includes the following operations.

201. The terminal displays a virtual scene, a target virtual object being displayed in the virtual scene.

The terminal is installed with a target application supporting a media resource display function. The terminal starts the target application in response to a start operation on the target application. The terminal displays the virtual scene on a display interface of the target application, and displays a target virtual object in the virtual scene.

The display interface is an interface of a terminal display screen, or the display interface is a display container. The area of the display interface is less than the area of the virtual scene, and the display interface is configured to display a partial region of the virtual scene. The target virtual object is a virtual object corresponding to a target account currently logged in to the terminal. The terminal can control the target virtual object to move in the virtual scene. With different moving positions and moving directions of the virtual object, different regions of the virtual scene can be displayed in the display interface.

202. The terminal displays a resource screen of at least one first media resource in the virtual scene.

The first media resource is a video, a picture gallery, or interaction information between a plurality of object accounts. The video may be a livestreaming video or a video uploaded by an object. The interaction information may be group chat messages among a plurality of objects.

The resource screen is a picture representing the first media resource. Exemplarily, the resource screen is a cover picture of the first media resource or a picture including content of the first media resource. In some embodiments, the resource screen may be a picture that only includes graphics, or a picture that combines graphics and text. This is not limited in the embodiments of the disclosure. For example, as shown in FIG. 3, if the first media resource is a video, the resource screen may be a video frame of the video; if the first media resource is a picture gallery, the resource screen may be any picture in the picture gallery; and if the first media resource is interaction information, and the resource screen may be a picture including the interaction information.

203. The terminal displays, in response to a move operation on the target virtual object in the virtual scene, based on a target position of the target virtual object, a resource screen of at least one second media resource corresponding to the target position in the virtual scene.

The target position is a position obtained after the target virtual object is moved in the virtual scene. The second media resource is a media resource corresponding to a target region in the virtual scene. The target region is a region in the virtual scene with the target position as a center and a size of the display interface as a range. All or part of the resource screen of the second media resource is in the target region.

In some embodiments, the at least one second media resource is partially identical with or completely different from at least one first media resource. This is not limited in the embodiments of the disclosure.

In the technical solutions provided in the embodiments of the disclosure, by displaying the resource screen of the media resource in the virtual scene, instead of displaying the media resource in the form of a list, the terminal can display, in response to the move operation on the target virtual object in the virtual scene, resource screens of different media resources in the virtual scene for objects to browse, thereby enriching the human-computer interaction mode and improving the experience of objects browsing media resources.

The embodiment corresponding to FIG. 2 above is a brief description of the media resource display method provided in the disclosure. The method is described in detail with reference to FIG. 4 in the embodiments of the disclosure. FIG. 4 is a flowchart of a media resource display method according to some embodiments of the disclosure. The method is performed by a terminal. As shown in FIG. 4, this embodiment includes the following operations.

401. The terminal displays a virtual scene, a target virtual object being displayed in the virtual scene.

The terminal starts a target application. Based on the target virtual object entering a virtual scene of the target application, the terminal determines a center of a display interface and a center of the virtual scene, and coincides the center of the virtual scene with the center of the display interface to display a central region of the virtual scene in the display interface and display the target virtual object in the center of the virtual scene. In some embodiments, the terminal further displays an operation control of the target virtual object in the display interface, where the operation control is used for controlling the target virtual object to move in the virtual scene.

For example, FIG. 5 is a schematic diagram of a central region of a virtual scene according to some embodiments of the disclosure. As shown in FIG. 5, a target virtual object 501 is displayed in a center of a virtual scene, and an operation control 502 of a target object is displayed in a lower right region of the display interface.

Figure 6:
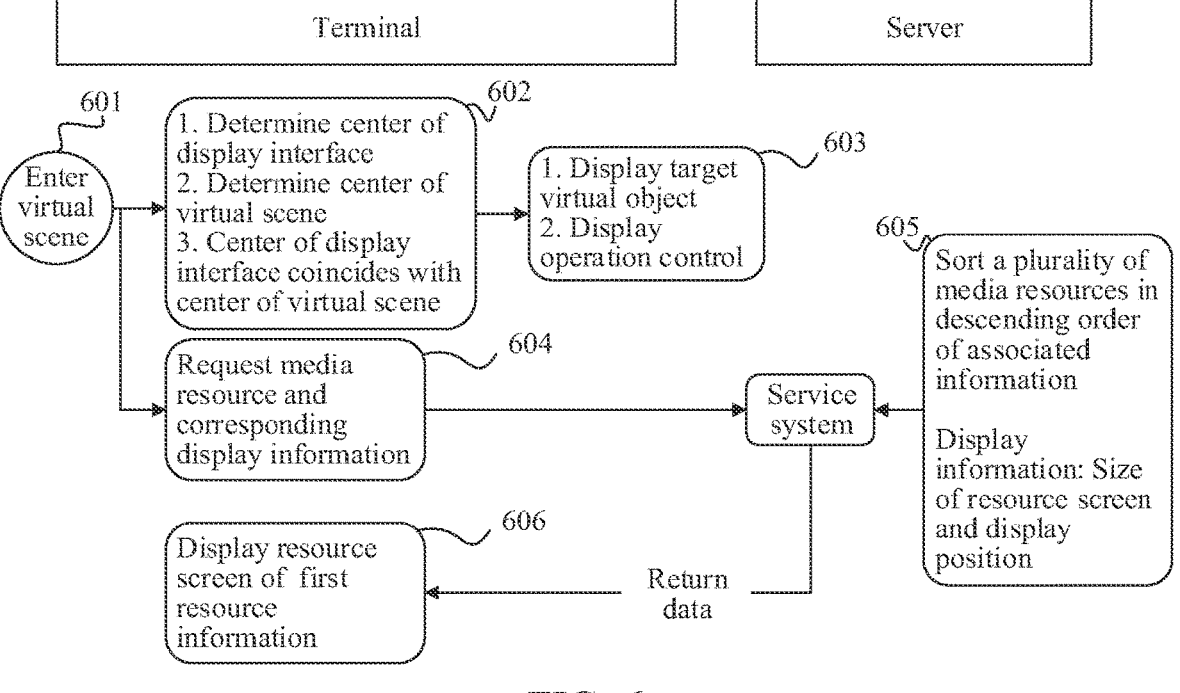
FIG. 6 is a flowchart of a media resource display method according to some embodiments of the disclosure.

Operation 401 corresponds to operations 601 to 603 in FIG. 6.

402. The terminal displays a resource screen of at least one first media resource in the virtual scene.

The terminal first obtains a plurality of media resources associated with a target account and corresponding display information. The target account is an object account corresponding to the target virtual object, that is, an object account currently logged in to the terminal. The display information is used for representing a display position of a resource screen of the media resource. Then, the terminal determines, from the plurality of media resources based on the display information, the at least one first media resource whose display position is in the central region of the virtual scene, and displays the resource screen of the at least one first media resource in the central region of the virtual scene. In some embodiments, the display information includes coordinates of vertices of the resource screen or coordinates of a center of the resource screen, and the coordinates of the vertices of the resource screen or the coordinates of the center of the resource screen are used for representing the display position of the resource screen.

The above process is described below through operations 402A and 402B.

402A. The terminal obtains a plurality of media resources associated with the target account and corresponding display information.

In some embodiments, the media resource associated with the target account is a media resource that has interacted with the target account, or a media resource uploaded by an object account followed by the target account, or a media resource uploaded by an object account following the target account. For example, the media resource that has interacted with the target account is a media resource that clicked, browsed, subscribed to, commented on, or shared by the target account.

In some embodiments, the terminal further obtains sizes of resource screens of the plurality of media resources, and the terminal can obtain the plurality of media resources associated with the target account, display positions, and the sizes in the following two manners.

In an implementation, the terminal presets the size of the resource screen. The terminal can obtain the preset size of the resource screen from a related configuration file, and obtain the plurality of media resources associated with the target account and the corresponding display positions by interacting with the server.

The process of interaction between the terminal and the server is described below. The terminal sends a first resource obtaining request of the target account to the server. The first resource obtaining request is used for indicating to return the plurality of media resources associated with the target account and the display positions. The server receives the first resource obtaining request, and obtains the plurality of media resources associated with the target account based on an identifier of the target account carried in the first resource obtaining request. Based on association information between each media resource and the target account, the server determines the display position of the resource screen of the media resource. The association information is used for representing a degree of association between the media resource and the target account. The server sends the obtained plurality of media resources and the display position to the terminal. The terminal obtains the plurality of media resources and the display position. For any media resource, a distance between the display position of the resource screen and the center of the virtual scene is inversely proportional to the degree of association between the media resource and the target account.

In another implementation, the terminal interacts with the server to obtain the plurality of media resources associated with the target account, the display positions, and the sizes.

The terminal sends a second resource obtaining request of the target account to the server. The second resource obtaining request is used for indicating to return the plurality of media resources associated with the target account and display information. The server receives the second resource obtaining request, and obtains the plurality of media resources associated with the target account and the display positions based on the same method as above. Based on exposure information of each media resource, the server determines the size of the resource screen of the media resource. The exposure information is used for representing a popularity degree of the media resource. The server sends the obtained plurality of media resources, and the display position and size to the terminal. The terminal obtains the plurality of media resources, the display positions and the sizes. For any media resource, the size of the resource screen is directly proportional to the popularity degree of the media resource.

In some embodiments, for any media resource, the server obtains the exposure information of the media resource based on information such as the number of clicks and the number of followers of the media resource. Based on a content tag of the media resource and an interest tag of the target account, the server obtains the association information between the media resource and the target account.

In some embodiments, the server sends the plurality of media resources and the display information to the terminal in the form of a queue, and each element in the queue is a media resource and display information. In some embodiments, the server arranges the plurality of media resources and the display information in the form of a queue in descending order of association information, and sends the sorted data to the terminal. In some embodiments, the server further sends association information of each media resource to the terminal. This is not limited in the embodiments of the disclosure.

In some embodiments, as shown in FIG. 6, a service system of the target application is deployed in the server, and the service system is configured to provide a backend service for the target application. Through the service system, the server obtains a plurality of media resources associated with the target account and display information, and sends the obtained data to the terminal.

402B. The terminal determines, from the plurality of media resources based on the display information, the at least one first media resource whose display position is in the central region of the virtual scene, and displays the at least one first media resource in the central region of the virtual scene.

By displaying the first media resource, the media resource with a high degree of association with the target account can be displayed in the central region of the virtual scene, so that the displayed media resource meets the interest of the object, thereby improving the object experience, and improving the display efficiency and the human-computer interaction efficiency of the media resource.

The process of determining at least one first media resource by the terminal is described below. First, the terminal determines coordinates of four vertices of each resource screen in the virtual scene based on the size and the display position of the resource screen of each media resource. For example, if the display position is the coordinates of the upper right vertex of the resource screen, the terminal can determine the coordinates of the other three vertices based on a width and a height of the resource screen. Then, the terminal determines the media resource whose coordinates of the four vertices meet a position condition as the first media resource, where the position condition is that the coordinates of any of the four vertices are within a range of the central region of the virtual scene.

In some embodiments, all or part of the resource screen of the first media resource is in the central region. Correspondingly, that the terminal displays a resource screen of at least one first media resource means: The terminal displays all or part of the resource screen of the at least one first media resource in the central region of the virtual scene based on the display information of the at least one first media resource. For example, as shown in FIG. 5, resource screens 503-508 of a plurality of first media resources are displayed in the central region of the virtual scene, where the resource screens 503-506 are all displayed in the central region, and the resource screens 507 and 508 are partially displayed in the central region.

The resource screen of the first media resource may be displayed in a quadrilateral form shown in FIG. 5, or may be displayed in a circular form, or may be displayed in a polygonal form. For example, the resource screen is displayed in a hexagon form, and the resource screens of the plurality of first media resources are displayed in a honeycomb form.

In some embodiments, based on the server sending the association information to the terminal, the terminal can directly determine the at least one first media resource whose association information is greater than a preset threshold directly from the plurality of media resources. The terminal displays the resource screen of the at least one first media resource in the central region of the virtual scene.

In some embodiments, the terminal further displays an object position map, a refresh control, and a return control in the virtual scene. The object position map is used for displaying the position of the target virtual object in the virtual scene in real time. The refresh control is used for re-obtaining a plurality of media resources related to the target account and display information. The return control is used for moving the target virtual object to the center of the virtual scene. For example, as shown in FIG. 5, the object position map is shown in a region 509, the refresh control is shown in a region 510, and the return control is shown in a region 511.

Operation 402 corresponds to operations 604 to 606 in FIG. 6.

403. The terminal displays, in response to a move operation on the target virtual object in the virtual scene, based on the target position of the target virtual object, a resource screen of at least one second media resource corresponding to the target position in the virtual scene.

In some embodiments, the terminal displays, based on the target position of the virtual object in the virtual scene, the target region corresponding to the target position in the virtual scene in the display interface. The terminal displays a resource screen of at least one second media resource corresponding to the target region in the target region of the virtual scene.

In some embodiments, when the target virtual object is moving in the virtual scene, the terminal always displays the target virtual object in the center of the display interface. Based on a moving direction and a moving distance of the target virtual object, the terminal displays the target region in the display interface by moving the virtual scene in an opposite direction by the same distance in the display interface.

The process of displaying the target region by the terminal is described below. In response to the move operation on the target virtual object, the terminal updates object coordinates of the target virtual object in the virtual scene through formula (1) based on the moving direction and the moving distance of the target virtual object, to obtain target object coordinates. The terminal obtains first scene coordinates of the virtual scene through formula (2) based on the target object coordinates, where the first scene coordinates are used for representing the position of the virtual scene relative to the display interface. The terminal moves the virtual scene in the display interface to the position indicated by the first scene coordinates to display the target region of the virtual scene in the display interface.

$$posX'=posX+x$$
$$posY'=posY+y \tag{1}$$

$$mapX_1=-posX'$$
$$mapY_1=-posY' \tag{2}$$

posX and posY respectively represent the abscissa and the ordinate of the target virtual object before updating. posX' and posY' respectively represent the abscissa and the ordinate of the target object coordinates. x and y are scalars, and respectively represent the moving distance and the moving direction of the target virtual object on the X axis and the Y axis in the virtual scene. If x is a positive number, it represents moving to the right of the X axis, and if y is a positive number, it represents moving to the upper part of the Y axis. $mapX_1$ and $mapY_1$ respectively represent the abscissa and the ordinate of the first scene coordinates.

404. The terminal plays, based on a duration for which the target virtual object stays in a resource screen of any second media resource reaching a duration threshold, the second media resource.

That the target virtual object stays in the resource screen means: The target virtual object is stationary in the resource screen, or the target virtual object moves within a display range of the resource screen without going beyond the display range.

In some embodiments, the terminal enhances the resource screen of the second media resource based on the target virtual object moving to the resource screen of any second media resource. The terminal plays the second media resource based on the enhanced resource screen based on the duration for which the target virtual object stays in the enhanced resource screen reaching the duration threshold. In some embodiments, the duration threshold is 1 second.

In some embodiments, in a case of enhancing the resource screen completely, the terminal plays the second media resource based on the enhanced resource screen. This is not limited in the embodiments of the disclosure.

In some embodiments, the terminal can enhance the resource screen of the second media resource by any one of or a combination of a plurality of the following manners: 1) zooming in the resource screen of the second media resource by a target multiple; 2) increasing brightness of the resource screen of the second media resource; and 3) displaying the resource screen of the second media resource in a center of a display interface. By enhancing the resource screen, the resource screen can be displayed more clearly in the interface, thereby improving the display efficiency of the resource screen, so that the object can better browse the resource screen, thereby improving the object experience.

An example in which the terminal zooms in the resource screen by a target multiple and displays the zoomed-in resource screen in the center of the display interface is used below to describe the enhancement process. The terminal determines the target multiple through formula (3) or formula (4) based on a size of the display interface and a size of the resource screen. The terminal zooms in the resource screen by the target multiple based on the target factor, the size of the display interface, and the size of the resource screen. The terminal obtains second scene coordinates of the virtual scene through formula (5). The terminal moves the virtual scene in the display interface to a position indicated by the second scene coordinates to display the zoomed-in resource screen in the center of the display interface. In some embodiments, the terminal zooms in the resource screen by zooming in the virtual scene by the target multiple. This is not limited in the embodiments of the disclosure.

$$factor = (viewW - paddingW)/w \quad (3)$$

$$factor = (viewH - paddingH)/h \quad (4)$$

$$mapX_2 = -(cardX - w/2)*factor$$

$$mapY_2 = -(cardY - h/2)*factor \quad (5)$$

factor represents the target multiple. viewW and viewH respectively represent a width and a height of the display interface. w and h respectively represent a width and a height of the resource screen. paddingW represents a difference between the width of the display interface and a width of the zoomed-in resource screen. paddingH represents a difference between the height of the display interface and a height of the zoomed-in resource screen. cardX and cardY respectively represent the abscissa and the ordinate of the upper right vertex of the resource screen in the virtual scene. (cardX−w/2) and (cardY−h/2) respectively represent the abscissa and the ordinate of the center of the resource screen in the virtual scene. $mapX_2$ and $mapY_2$ respectively represent the abscissa and the ordinate of the second scene coordinates.

That the terminal plays the second media resource based on the enhancing resource screen means: The terminal plays the second media resource in a corresponding manner at the position of the processed resource screen according to a different manner for enhancing the resource screen. If the resource screen is zoomed in by the target multiple, the terminal plays the second media resource based on a size of the zoomed-in resource screen. If the brightness of the resource screen is increased, the terminal plays the second media resource with the adjusted brightness. If the resource screen is displayed in the center of the display interface, the terminal plays the second media resource in the center of the display interface.

Figure 7:
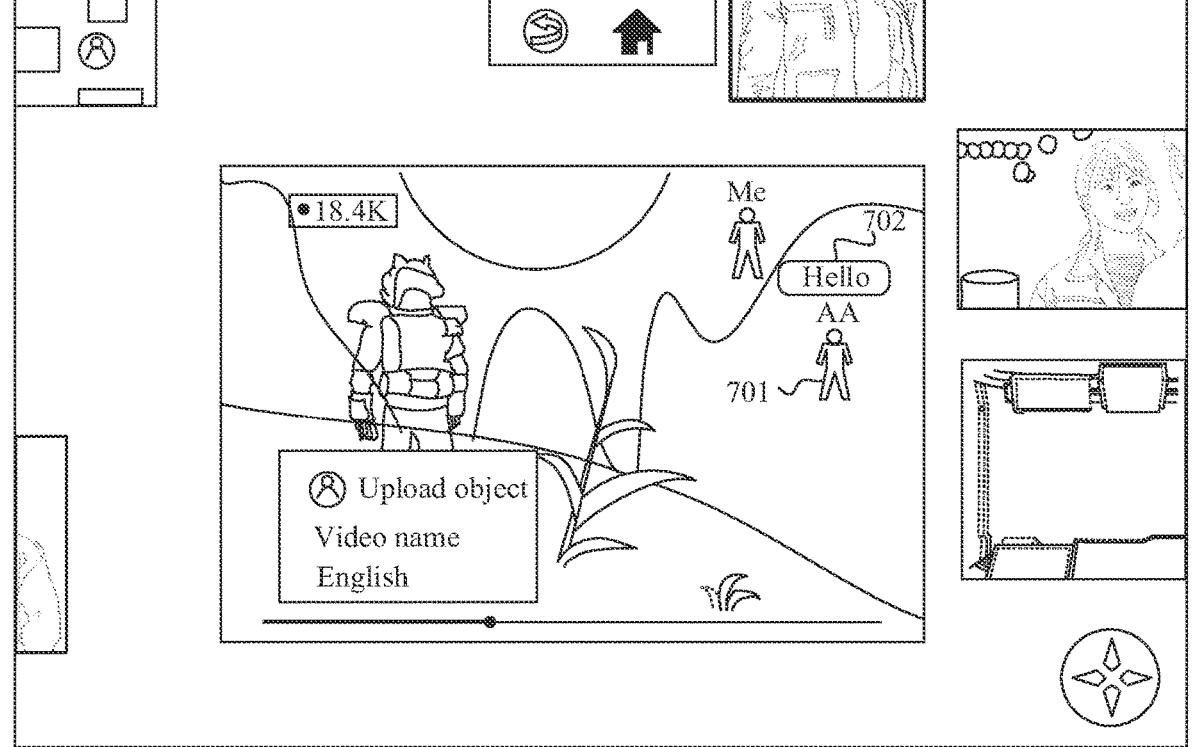
FIG. 7 is a schematic diagram of playing a second media resource in a virtual scene according to some embodiments of the disclosure.

In some embodiments, the terminal can play the second media resource in the following three manners:

1) Based on the second media resource being a video, play the video. In some embodiments, as shown in FIG. 7, the terminal further displays information such as a playback progress bar, an upload object, a video name, and a language tag of the video.

2) Based on the second media resource being a picture gallery, display a plurality of pictures included in the picture gallery in carousel mode. In some embodiments, the terminal further displays information such as an upload object of the picture gallery, a name of the picture gallery, and a theme tag.

3) Display, based on the second media resource being interaction information between a plurality of object accounts, the interaction information between the plurality of object accounts in an automatic scrolling manner. In some embodiments, the terminal further displays object names and avatars of the plurality of object accounts.

In some embodiments, each second media resource corresponds to a virtual space, the virtual space is used for playing the corresponding second media resource, and the plurality of object accounts in the same virtual space can interact in the virtual space. For example, if the second media resource is a livestreaming video, the corresponding virtual space is a livestreaming room; or if the second media resource is interaction information between the plurality of object accounts, the corresponding virtual space is a chat room. For any second media resource, the terminal can display a first virtual object of an object account in the virtual space of the second media resource in the enhanced resource screen of the second media resource. The first virtual object is a virtual character used for representing the object account in the virtual space.

The process of displaying the first virtual object by the terminal is described below. The terminal sends an object obtaining request of the second media resource to the server, where the object obtaining request is used for indicating to return the object account in the virtual space of the second media resource. The server receives the object obtaining request, and obtains the object account in the virtual space of the second media resource based on an identifier of the second media resource carried in the object obtaining request. The server sends the obtained object account to the terminal. The terminal receives the object account sent by the server, and displays the first virtual object corresponding to the object account in a processed media screen. In some embodiments, the server further sends the object name corresponding to the object account to the terminal. The terminal can display the corresponding object name above the first virtual object. For example, as shown in FIG. 7, the terminal displays the first virtual object 701 in the enhanced resource screen.

During the process of playing the second media resource, the first virtual object is always displayed at the position corresponding to the second media resource. In some embodiments, the terminal moves the first virtual object to a first position in response to a move operation on the first virtual object. The first position is a position indicated by the move operation. By moving the first virtual object, the first virtual object can be prevented from blocking the playback screen of the second media resource, so that the object can better view the second media resource, thereby improving the viewing efficiency of the second media resource, and improving the object experience.

In some embodiments, the terminal displays a first interactive control in the virtual scene in response to a click operation on the first virtual object. The first interactive control is used for interacting with the object account of the first virtual object in the virtual scene. In some embodiments, the terminal displays the interaction information between the target virtual object and the first virtual object above the virtual object. For example, as shown in FIG. 7, if the object account of the first virtual object sends a message to the target account, content 702 of the message is displayed above the first virtual object 701. By displaying the first interactive control, the object can interact with the object account viewing the second media resource in the virtual scene without entering the virtual space of the second media resource, thereby enriching the social methods between a plurality of object accounts and improves the efficiency of interaction between object accounts.

In some embodiments, for any second media resource, the terminal sends a notification message to the server after enhancing the resource screen of the second media resource. The notification message is used for indicating that the target terminal is in the resource screen of the second media resource. Correspondingly, the terminal can obtain another object account in the resource screen by interacting with the server. In the processed resource screen, the terminal displays a second virtual object of the another object account in the resource screen. Correspondingly, the terminal can further move the second virtual object to a corresponding position based on a move operation on the second virtual object, and the terminal can display controls used for interacting with the second virtual object based on a click operation on the second virtual object.

405. The terminal plays the second media resource in a virtual space corresponding to the second media resource in response to the click operation on the resource screen of any second media resource.

In some embodiments, the terminal moves the target virtual object to the resource screen of the second media resource in response to the click operation on the resource screen of any second media resource. The terminal plays the second media resource in the virtual space corresponding to the second media resource. The terminal sends an entry message of the target virtual object to the server, where the entry message is used for indicating that the target account enters the virtual space of the second media resource.

In some embodiments, the terminal displays a second interactive control in the virtual space of the second media resource. The second interactive control is used for interacting, in the virtual space of the second media resource, with an object account in the virtual space.

Figure 8:
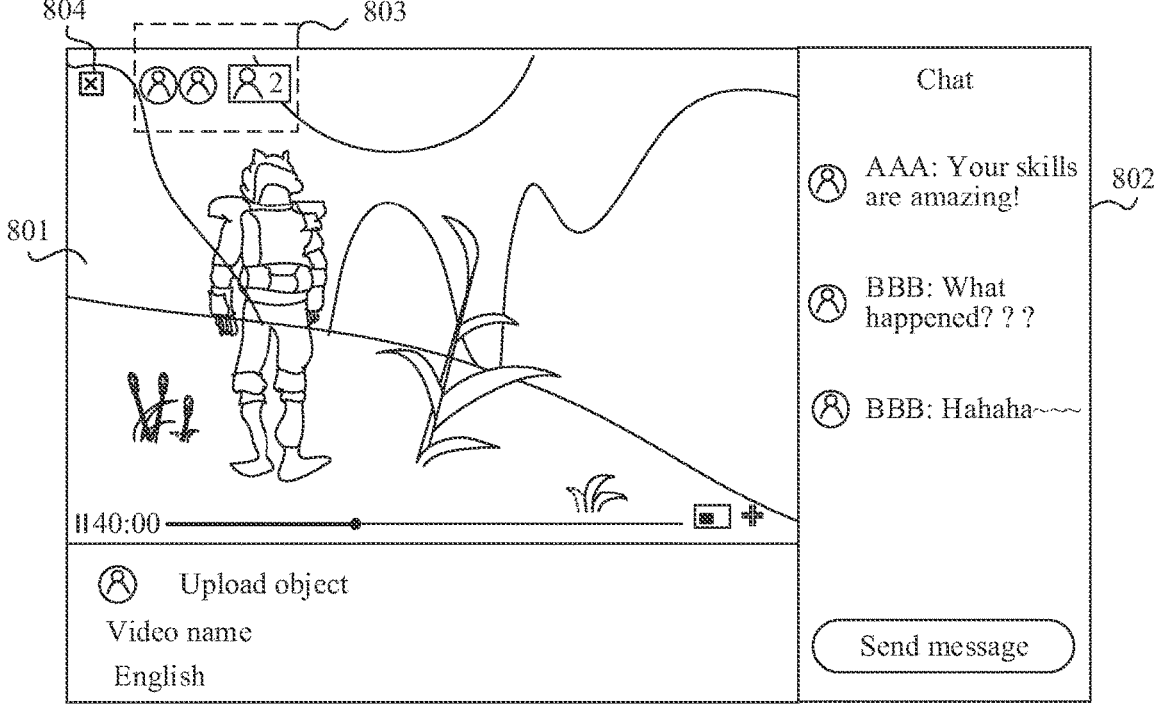
FIG. 8 is a schematic diagram of playing a second media resource in a virtual space according to some embodiments of the disclosure.

For example, as shown in FIG. 8, the terminal plays the second media resource in a region 801 in the virtual space.

A region 802 is a second interactive control, where the second interactive control can further display interaction information between a plurality of object accounts. In some embodiments, as shown in a region 803 in FIG. 8, the terminal further displays the number and the avatars of object accounts in the virtual space.

In another example, as shown in a region 804 in FIG. 8, the terminal further displays an exit control in the virtual space, where the exit control used for exiting the virtual space of the second media resource. The terminal exits the virtual space of the second media resource in response to a click operation on the exit control. The terminal displays a virtual scene, and displays the enhanced resource screen of the second media resource in the virtual scene. The terminal sends an exit message to the server, where the exit message is used for indicating that the target account exits the virtual space of the second media resource.

The above operation 404 and operation 405 respectively describe the process of playing the second media resource in the virtual scene and the process of playing the second media resource in the virtual space. The terminal can play the second media resource by performing operation 404 or operation 405 based on different operations of the object in the virtual scene. The execution order of operation 404 and operation 405 is not limited in the embodiments of the disclosure.

In some embodiments, the terminal can further zoom the virtual scene. Correspondingly, the method further includes: The terminal displays, in response to a zoom operation on the virtual scene, a zoomed virtual scene based on a zoom factor of the zoom operation. The terminal displays, based on a second position of the target virtual object, a resource screen of at least one third media resource corresponding to the second position in the zoomed virtual scene.

In some embodiments, the terminal zooms the resource screen with the virtual scene by the same multiple, so that by zooming the virtual scene, the number of resource screens displayed in the display interface varies. A larger multiple by which the virtual scene is zoomed in indicates fewer resource screens are displayed in display interface by the terminal; and a larger factor by which the virtual scene is zoomed out indicates that more resource screens are displayed in the display interface of the terminal. In some embodiments, based on the multiple by which the virtual scene is zoomed out reaches the maximum, 7 resource screens at most can be displayed in the display interface.

In the technical solutions provided in the embodiments of the disclosure, by displaying the resource screen of the media resource in the virtual scene, instead of displaying the media resource in the form of a list, the terminal can display, in response to the move operation on the target virtual object in the virtual scene, resource screens of different media resources in the virtual scene for objects to browse, thereby enriching the human-computer interaction mode and improving the experience of objects browsing media resources and the human-computer interaction efficiency.

Figure 9:
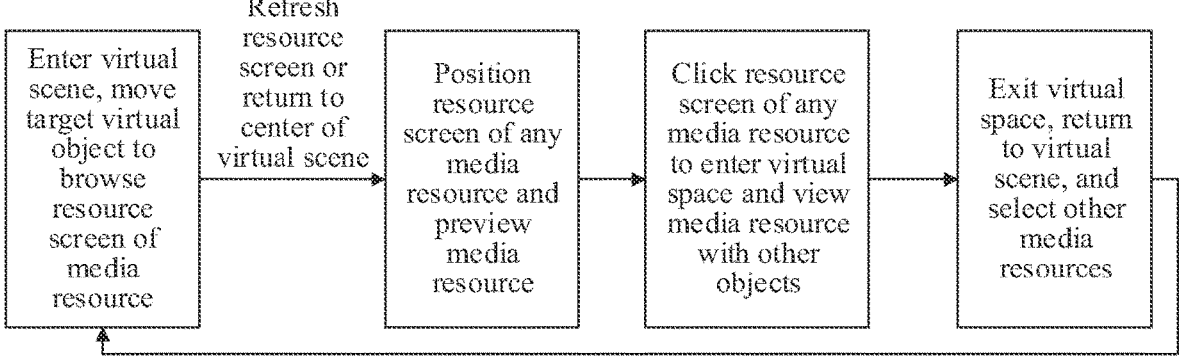
FIG. 9 is a service flowchart of a media resource display method according to some embodiments of the disclosure.

Based on the media resource display method shown in FIG. 4, the process of objects browsing media resources in the virtual scene is described below with reference to FIG. 9. As shown in FIG. 9, the object enters the virtual scene by starting the target application, and controls the target virtual object to move in the virtual scene. Based on the same method as operations 401 to 403, the terminal displays the resource screen of the media resource in the virtual scene for the object to browse. During this process, the object can refresh the resource screen displayed in the interface by clicking the refresh control, and control the target virtual object to return to the center of the virtual scene by clicking the return control. When the object controls the target virtual object to be positioned in the resource screen of any media resource, the terminal can play the media resource in the virtual scene based on the same method as operation 404, so that the object can preview the media resource in the virtual scene. When the object clicks the resource screen of any media resource, the terminal can play the media resource in the corresponding virtual space based on the same method as operation 405, so that the object can view the media resource with other objects in the virtual space and interact in the virtual space. In the process of viewing the media resource in the virtual space, the object can click the exit control to exit the virtual space and return to the virtual scene to select other media resources to view.

The process of displaying resource screens of different media resources and the process of playing media resources are described above in the embodiment corresponding to FIG. 4. The process of moving the target virtual object in the virtual scene is described in detail with reference to FIG. 10 in the embodiments of the disclosure.

Figure 10:
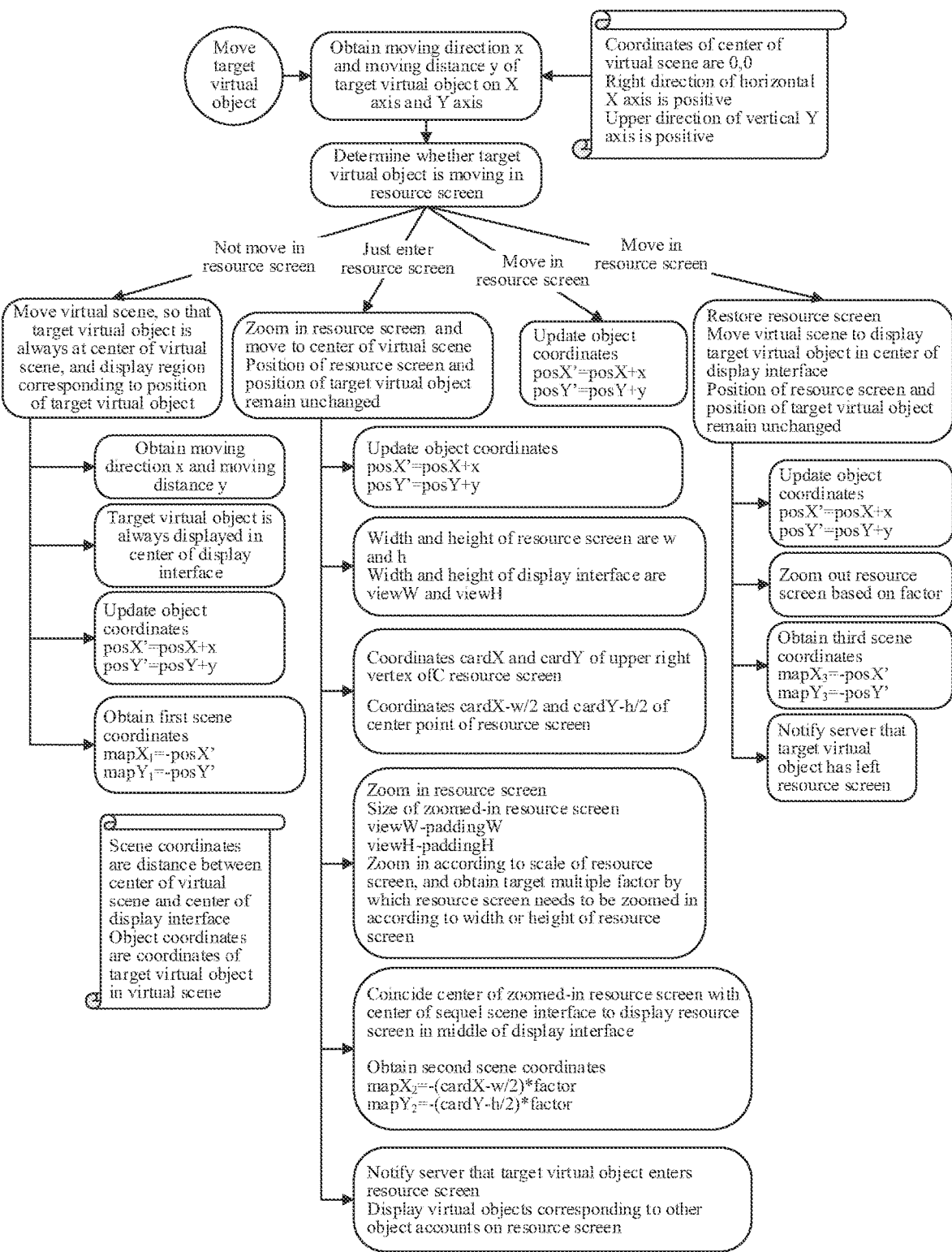
FIG. 10 is a principle flowchart of movement of a target virtual object according to some embodiments of the disclosure.

As shown in FIG. 10, the terminal obtains a moving direction and a moving distance of the target virtual object in the X axis and the Y axis in the virtual scene in response to the move operation on the target virtual object, and the terminal determines whether the target virtual object moves in the resource screen of the media resource based on the moving direction and the moving distance. The terminal performs corresponding processing on the target virtual object and the virtual scene according to the determining result, to move the target virtual object to a corresponding position in the virtual scene and display a corresponding region in the virtual scene. Specifically, it includes the following four cases.

1) Not Move in the Resource Screen

Based on the target virtual object not moving in the resource screen, the terminal updates object coordinates of the target virtual object in the virtual scene based on the same method as formula (1). The terminal obtains first scene coordinates of the virtual scene based on the same method as formula (2) according to the updated object coordinates. The terminal moves the virtual scene based on the first scene coordinates to display the region corresponding to the position of the target virtual object.

2) Just Enter the Resource Screen

Based on the target virtual object entering the resource screen, the terminal updates object coordinates of the target virtual object in the virtual scene based on the same method as formula (1). Based on the same method as formula (3) to formula (5), the terminal obtains a target multiple by which the resource screen needs to be zoomed in and second scene coordinates of the virtual scene. The terminal zooms in the resource screen by the target multiple. The terminal moves the virtual scene based on the second scene coordinates, so that a zoomed-in resource screen is displayed in the center of the display interface.

In some embodiments, the terminal displays the first virtual object of the object account in the virtual space in the zoomed-in resource screen by interacting with the server.

In some embodiments, the terminal notifies the server that the target virtual object enters the resource screen, and by interacting with the server, displays the second virtual object of the another object account in the resource screen in the zoomed-in resource screen by interacting with the server.

3) Move in the Resource Screen

Based on the target virtual object moving in the resource screen, the terminal updates object coordinates of the target virtual object based on the same method as formula (1), and moves the target virtual object to a position indicated by the updated object coordinates.

When the target virtual object is moving in the resource screen, the terminal always displays the resource screen in the center of the display interface, and there is no need to display the target virtual object in the center of the display interface. Therefore, the terminal needs to only move the target virtual object, and there is no need to move the virtual scene, reducing resource consumption required for moving the virtual scene.

4) Leave the Resource Screen

Based on the target virtual object leaving the resource screen, the terminal updates object coordinates of the target virtual object based on the same method as formula (1). The terminal zooms out the resource screen by the target multiple. The terminal obtains third scene coordinates of the virtual scene based on the same method as formula (2) according to the updated object coordinates. The terminal moves the virtual scene based on the third scene coordinates, to display a region corresponding to the position of the target virtual object, and display the target virtual object in the center of the display interface. In some embodiments, the terminal zooms out the resource screen by zooming out the target multiple of the virtual scene. This is not limited in the embodiments of the disclosure.

In some embodiments, the terminal notifies the server that the target virtual object has left the resource screen.

Figures 11, 12:
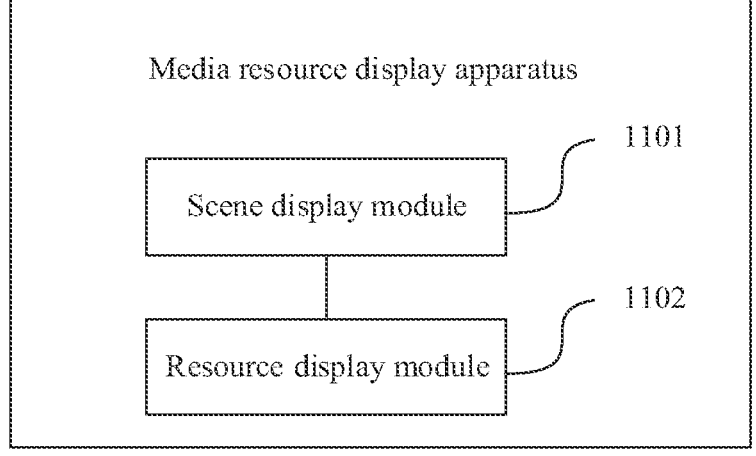
FIG. 11 is a schematic structural diagram of a media resource display apparatus according to some embodiments of the disclosure.
FIG. 12 is a schematic structural diagram of a terminal according to some embodiments of the disclosure.

FIG. 11 is a schematic structural diagram of a media resource display apparatus according to some embodiments of the disclosure. As shown in FIG. 11, the apparatus includes: a scene display module 1101 and a resource display module 1102.

The scene display module 1101 is configured to display a virtual scene, a target virtual object being displayed in the virtual scene.

The resource display module 1102 is configured to display a resource screen of at least one first media resource in the virtual scene.

The resource display module 1102 is configured to display, in response to a move operation on the target virtual object in the virtual scene, based on a target position of the target virtual object, a resource screen of at least one second media resource corresponding to the target position in the virtual scene.

In some embodiments, the resource display module 1102 is configured to display the resource screen of the at least one first media resource in the virtual scene, where association information between the at least one first media resource and the target account is greater than a preset threshold, the target account is an object account corresponding to the target virtual object, and the association information is used for representing a degree of association between the first media resource and the target account.

In some embodiments, the scene display module 1101 is configured to display a central region of the virtual scene based on the target virtual object entering the virtual scene;

The resource display module 1102 is configured to display the resource screen of the at least one first media resource corresponding to the central region in the central region of the virtual scene.

In some embodiments, the apparatus further includes:

an obtaining module, configured to obtain display information of a plurality of media resources associated with the target account, where the display information is used for representing a display position of a resource screen of the media resource, and the display position of the resource screen is obtained based on a degree of association between the media resource and the target account.

The resource display module 1102 is configured to determine, from a plurality of media resources based on the display information, the at least one first media resource whose display position is in the central region; and display the resource screen of the at least one first media resource in the central region of the virtual scene.

In some embodiments, the obtaining module is configured to obtain sizes of resource screens of the plurality of media resources associated with the target account, where the sizes of the resource screens are obtained based on popularity degrees of the media resources.

The resource display module 1102 is configured to determine coordinates of four vertices of the plurality of media resources in the virtual scene based on the display information and the sizes of the resource screens of the plurality of media resources; and determine the media resource whose coordinates of the four vertices meet a position condition as the first media resource, where the position condition is that the coordinates of any of the four vertices are within a range of the central region.

In some embodiments, the apparatus further includes: a first playback module, configured to play, based on a duration for which the target virtual object stays in a resource screen of any second media resource reaches a duration threshold, the second media resource.

In some embodiments, the first playback module includes: a processing submodule, configured to enhance the resource screen of the second media resource based on the target virtual object moving to the resource screen of any second media resource; and a playback submodule, configured to play the second media resource based on the enhanced resource screen based on the duration for which the target virtual object stays in the enhanced resource screen reaches the duration threshold.

In some embodiments, the processing submodule is configured to perform any of the following:

zooming in the resource screen of the second media resource by a target multiple;

increasing brightness of the resource screen of the second media resource; and displaying the resource screen of the second media resource in a center of a display interface, where the display interface is used for displaying the virtual scene.

In some embodiments, the playback submodule is configured to play, based on the second media resource being a video, the video; display, based on the second media resource being a picture gallery, a plurality of pictures included in the picture gallery in carousel mode; display, based on the second media resource being interaction information between a plurality of object accounts, the interaction information between the plurality of object accounts in an automatic scrolling manner.

In some embodiments, the apparatus further includes: an object display module, configured to display a first virtual object in the enhanced resource screen, where an object account of the first virtual object is in a virtual space of the second media resource.

In some embodiments, the apparatus further includes: a moving module, configured to move the first virtual object to a first position in response to a move operation on the first virtual object.

In some embodiments, the apparatus further includes: a control display module, configured to display a first interactive control in the virtual scene in response to a click operation on the first virtual object, where the first interactive control is used for interacting with the object account of the first virtual object in the virtual scene.

In some embodiments, the apparatus further includes: a second playback module, configured to play, in response to a click operation on a resource screen of any second media resource, the second media resource.

In some embodiments, the second playback module is configured to play the second media resource in a virtual space corresponding to the second media resource in response to the click operation on the resource screen of any second media resource.

In some embodiments, the moving module is configured to move the target virtual object to the resource screen of the second media resource.

In some embodiments, the control display module is configured to display a second interactive control in the virtual space of the second media resource, where the second interactive control is used for interacting, in the virtual space of the second media resource, with an object account in the virtual space.

In some embodiments, the apparatus further includes: a zoom module, configured to display, in response to a zoom operation on the virtual scene, a zoomed virtual scene based on a zoom factor of the zoom operation; and display, based on a second position of the target virtual object, a resource screen of at least one third media resource corresponding to the second position in the zoomed virtual scene.

In some embodiments, the target virtual object is in the center of the display interface.

Some embodiments of the disclosure provides a computer device configured to perform the above media resource display method. In some embodiments, the computer device is provided as a terminal. FIG. 12 is a schematic structural diagram of a terminal according to some embodiments of the disclosure. The terminal 1200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as another name such as user equipment, a portable terminal, a laptop terminal, or a desktop terminal.

Generally, the terminal 1200 includes one or more processors 1201 and one or more memories 1202.

The processor 1201 may include one or more processing cores, and may be, for example, a 4-core processor or an 8-core processor. The processor 1201 may be implemented by using at least one hardware form of digital signal processing (DSP), a field-programmable gate array (FPGA), and a programmable logic array (PLA). The processor 1201 may further include a main processor and a coprocessor. The main processor is a processor configured to process data in an awake state, and is also referred to as a central processing unit (CPU). The coprocessor is a low power consumption processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process computing operations related to machine learning.

The memory 1202 may include one or more computer-readable storage media that may be non-transitory. The memory 1202 may further include a high-speed random access memory and a non-volatile memory, for example, one or more disk storage devices or flash storage devices. In some embodiments, the non-transitory computer-readable storage medium in the memory 1202 is configured to store at least one program code, the at least one program code being configured to be executed by the processor 1201 to implement the media resource display method provided in the method embodiments of the disclosure.

In some embodiments, the terminal 1200 may further in some embodiments include: a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a display screen 1205, an audio circuit 1207, or a power supply 1208.

The peripheral device interface 1203 may be configured to connect at least one peripheral device related to input/output (I/O) to the processor 1201 and the memory 1202. In some embodiments, the processor 1201, the memory 1202, and the peripheral device interface 1203 are integrated on the same chip or circuit board. In some other embodiments, any one or two of the processor 1201, the memory 1202, or the peripheral device interface 1203 may be implemented on an independent chip or circuit board. This is not limited in this embodiment.

The display screen 1205 is configured to display a user interface (UI). The UI may include graphics, text, icons, videos, and any combination thereof. When the display screen 1205 is a touch display screen, the display screen 1205 is further capable of collecting a touch signal on or above a surface of the display screen 1205. The touch signal may be inputted, as a control signal, to the processor 1201 for processing. In this case, the display screen 1205 may be further configured to provide a virtual button and/or a virtual keyboard that is also referred to as a soft button and/or a soft keyboard. In some embodiments, there may be one display screen 1205, disposed on a front panel of the terminal 1200. In some other embodiments, there may be at least two display screens 1205, respectively disposed on different surfaces of the terminal 1200 or designed in a foldable shape. In some embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be prepared by using materials such as a liquid-crystal display (LCD), an organic light-emitting diode (OLED), and the like.

The audio circuit 1207 may include a microphone and a speaker. The microphone is configured to acquire sound waves of users and surroundings, and convert the sound waves into electrical signals and input the signals to the processor 1201 for processing. For a purpose of stereo acquisition or noise reduction, there may be a plurality of microphones respectively disposed at different portions of the terminal 1200. The microphone may be further an array microphone or an omnidirectional microphone. The speaker is configured to convert electrical signals from the processor 1201 into sound waves. The speaker may be a traditional thin-film speaker or a piezoelectric ceramic speaker. When the speaker is the piezoelectric ceramic speaker, the speaker can not only convert electrical signals into sound waves audible to human beings, but also convert electrical signals into sound waves inaudible to human beings for ranging and other purposes. In some embodiments, the audio circuit 1207 may further include a headphone jack.

The power supply 1208 is configured to supply power to components in the terminal 1200. The power supply 1208 may be an alternating-current power supply, a direct-current power supply, a disposable battery, or a rechargeable battery. Based on the power supply 1208 including the rechargeable battery, the rechargeable battery may support wired charging or wireless charging. The rechargeable battery may be further configured to support a quick charge technology.

A person skilled in the art may understand that the structure shown in FIG. 12 constitutes no limitation on the terminal 1200, and the terminal may include more or fewer components than those shown in the figure, or some components may be combined, or a different component deployment may be used.

In some embodiments, a computer-readable storage medium, for example, a memory including at least one program code is further provided. The at least one program code may be executed by a processor to implement the media resource display method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

In some embodiments, a computer program product is further provided. The computer program product includes at least one computer program, the at least one computer program being stored in a computer-readable storage medium. A processor of a computer device reads the at least one computer program from the computer-readable storage medium, and the processor executes the at least one computer program, so that the computer device performs the above media resource display method.

In some embodiments, the computer program involved in the embodiments of the disclosure may be deployed and executed on one computer device, or executed on a plurality of computer devices at one location, or executed on a plurality of computer devices distributed in a plurality of locations and interconnected through a communication network. The plurality of computer devices distributed in a plurality of locations and interconnected through a communication network may form a blockchain system.

A person of ordinary skill in the art may understand that all or some of the operations of the foregoing embodiments may be implemented by hardware, or may be implemented a program instructing related hardware. The program may be stored in a computer-readable storage medium. The storage medium may be: a ROM, a magnetic disk, or an optical disc.

The foregoing embodiments are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. A media resource display method, performed by a terminal, the method comprising:

displaying a virtual scene, a target virtual object being displayed in the virtual scene;

displaying a resource screen of at least one first media resource in the virtual scene;

based on a move operation being performed on the target virtual object in the virtual scene, and based on a target position of the target virtual object, displaying a resource screen of at least one second media resource corresponding to the target position in the virtual scene, wherein the at least one second media resource is included in the at least one first media resource; and based on a duration for which the target virtual object stays in a resource screen of a second media resource reaching a duration threshold, enhancing the resource screen of the second media resource based on the target virtual object moving to the resource screen of the second media resource, wherein the enhancing comprises:

zooming in the resource screen of the second media resource by a target multiple;

increasing brightness of the resource screen of the second media resource; and displaying the resource screen of the second media resource in a center of a display interface, wherein the display interface is configured to display the virtual scene; and playing the second media resource according to the enhanced resource screen based on the duration reaching the duration threshold, wherein the playing the second media resource comprises:

displaying a plurality of pictures included in a picture gallery in carousel mode in response to determining that the second media resource is the picture gallery; and displaying interaction information between a plurality of object accounts in an automatic scrolling manner in response to determining that the second media resource is the interaction information between the plurality of object accounts.

2. The method according to claim 1, wherein the displaying the resource screen of the at least one first media resource in the virtual scene comprises:

determining whether association information between the at least one first media resource and a target account is greater than a preset threshold, wherein the target account is an object account corresponding to the target virtual object, and the association information is a degree of association between the at least one first media resource and the target account; and based on the association information being greater than the preset threshold, displaying the resource screen of the at least one first media resource in the virtual scene.

3. The method according to claim 2, wherein the displaying the virtual scene comprises:

displaying a central region of the virtual scene based on the target virtual object entering the virtual scene; and wherein the displaying the resource screen comprises displaying the resource screen of the at least one first media resource corresponding to the central region in the central region of the virtual scene, wherein the method further comprises:

obtaining display information of a plurality of media resources associated with the target account, wherein the display information represents a display position of the resource screen, and the display position of the resource screen is obtained based on the degree of association between the at least one first media resource and the target account, and wherein the displaying the resource screen of the at least one first media resource corresponding to the central region in the central region of the virtual scene comprises:

determining, from the plurality of media resources based on the display information, the at least one first media resource having the display position in the central region; and displaying the resource screen of the at least one first media resource in the central region of the virtual scene.

4. The method according to claim 3, further comprising:

obtaining sizes of resource screens of the plurality of media resources associated with the target account, wherein the sizes of the resource screens are obtained based on popularity degrees of the plurality of media resources, wherein the determining, from the plurality of media resources based on the display information, the at least one first media resource having display position in the central region comprises:

determining coordinates of four vertices of the plurality of media resources in the virtual scene based on the display information and the sizes of the resource screens of the plurality of media resources; and determining a media resource for which the coordinates of the four vertices meet a position condition as the at least one first media resource, wherein the position condition is that the coordinates of any of the four vertices are within a range of the central region.

5. The method according to claim 1, further comprising:

displaying a first virtual object in the enhanced resource screen, wherein an object account of the first virtual object is included in a virtual space of the second media resource.

6. The method according to claim 5, further comprising:

based on a move operation being performed on the first virtual object, moving the first virtual object to a first position indicated by the move operation.

7. The method according to claim 5, further comprising:

displaying a first interactive control in the virtual scene based on a click operation being performed on the first virtual object, wherein the first interactive control is used for interacting with the object account of the first virtual object in the virtual scene.

8. The method according to claim 1, further comprising:

based on a click operation being performed on the resource screen of the second media resource, playing the second media resource, wherein the playing comprises:

playing the second media resource in a virtual space of the second media resource based on the click operation being performed on the resource screen of the second media resource; and displaying a second interactive control in the virtual space of the second media resource, wherein the second interactive control is used for interacting with an object account in the virtual space of the second media resource.

9. A media resource display apparatus comprising:

at least one non-transitory memory containing program code; and at least one processor configured to execute the program code, the program code comprising:

first displaying code configured to cause the at least one processor to display a virtual scene, wherein a target virtual object is displayed in the virtual scene;

second displaying code configured to cause the at least one processor to display a resource screen of at least one first media resource in the virtual scene;

third displaying code configured to cause the at least one processor to, based on a move operation being performed on the target virtual object in the virtual scene, and based on a target position of the target virtual object, display a resource screen of at least one second media resource corresponding to the target position in the virtual scene, wherein the at least one second media resource is included in the at least one first media resource; and enhancing code configured to cause the at least one processor to enhance the resource screen of the second media resource based on the target virtual object moving to the resource screen of the second media resource, wherein the enhancing code is further configured to cause the at least one processor to perform at least one of:

zooming the resource screen of the second media resource by a target multiple, increasing brightness of the resource screen of the second media resource, and displaying the resource screen of the second media resource in a center of a display interface, wherein the display interface is configured to display the virtual scene; and playing code configured to cause the at least one processor to play the second media resource according to the enhanced resource screen based on the duration reaching the duration threshold, wherein the playing code is configured to cause the at least one processor to:

based on the second media resource being a video, playing the video, or based on the second media resource being a picture gallery, displaying a plurality of pictures included in the picture gallery in carousel mode; and based on the second media resource being interaction information between a plurality of object accounts, displaying the interaction information between the plurality of object accounts in an automatic scrolling manner.

10. The apparatus according to claim 9, wherein the second displaying code is further configured to cause the at least one processor to:

determine whether association information between the at least one first media resource and a target account is greater than a preset threshold, wherein the target account is an object account corresponding to the target virtual object, and the association information is a degree of association between the at least one first media resource and the target account; and based on the association information being greater than the preset threshold, display the resource screen of the at least one first media resource in the virtual scene.

11. The apparatus according to claim 10, wherein the first displaying code is further configured to cause the at least one processor to display a central region of the virtual scene based on the target virtual object entering the virtual scene, and wherein the third displaying code is further configured to cause the at least one processor to display the resource screen of the at least one first media resource corresponding to the central region in the central region of the virtual scene, wherein the program code further comprises first obtaining code configured to cause the at least one processor to obtain display information of a plurality of media resources associated with the target account, wherein the display information represents a display position of the resource screen, and the display position of the resource screen is obtained based on the degree of association between the at least one first media resource and the target account, and wherein the third displaying code comprises:

first determining code configured to cause the at least one processor to determine, from the plurality of media resources based on the display information, the at least one first media resource having the display position in the central region; and fourth displaying code configured to cause the at least one processor to display the resource screen of the at least one first media resource in the central region of the virtual scene.

12. The apparatus according to claim 11, wherein the program code further comprises second obtaining code configured to cause the at least one processor to obtain sizes of resource screens of the plurality of media resources associated with the target account, wherein the sizes of the resource screens are obtained based on popularity degrees of the plurality of media resources, wherein the first determining code comprises:

second determining code configured to cause the at least one processor to determine coordinates of four vertices of the plurality of media resources in the virtual scene based on the display information and the sizes of the resource screens of the plurality of media resources; and third determining code configured to cause the at least one processor to determine a media resource for which the coordinates of the four vertices meet a position condition as the at least one first media resource, wherein the position condition is that the coordinates of any of the four vertices are within a range of the central region.

13. The apparatus according to claim 9, wherein the program code further comprises fifth displaying code configured to cause the at least one processor to display a first virtual object in the enhanced resource screen, wherein an object account of the first virtual object is included in a virtual space of the second media resource.

14. The apparatus according to claim 13, wherein the program code further comprises moving code configured to cause the at least one processor to, based on a move operation being performed on the first virtual object, move the first virtual object to a first position indicated by the move operation.

15. The apparatus according to claim 13, wherein the program code further comprises:

sixth displaying code configured to cause the at least one processor to display a first interactive control in the virtual scene based on a click operation being performed on the first virtual object, wherein the first interactive control is used for interacting with the object account of the first virtual object in the virtual scene.

16. A non-transitory computer-readable medium for media resource display containing program code that when executed by at least one processor, causes the at least one processor to:

display a virtual scene, a target virtual object being displayed in the virtual scene;

display a resource screen of at least one first media resource in the virtual scene;

based on a move operation being performed on the target virtual object in the virtual scene, and based on a target position of the target virtual object, display a resource screen of at least one second media resource corresponding to the target position in the virtual scene, wherein the at least one second media resource is included in the at least one first media resource; and based on a duration for which the target virtual object stays in a resource screen of a second media resource reaching a duration threshold, enhance the resource screen of the second media resource based on the target virtual object moving to the resource screen of the second media resource, wherein the enhancing comprises:

zooming in the resource screen of the second media resource by a target multiple;

increasing brightness of the resource screen of the second media resource; and displaying the resource screen of the second media resource in a center of a display interface, wherein the display interface is configured to display the virtual scene; and playing the second media resource according to the enhanced resource screen based on the duration reaching the duration threshold, wherein the playing the second media resource comprises:

based on the second media resource being a video, playing the video, or based on that the second media resource being a picture gallery, displaying a plurality of pictures included in the picture gallery in carousel mode; and based on the second media resource being interaction information between a plurality of object accounts, displaying the interaction information between the plurality of object accounts in an automatic scrolling manner.

* * * * *